United States Patent
Ahn et al.

(10) Patent No.: US 11,336,401 B2
(45) Date of Patent: May 17, 2022

(54) METHOD OF RETRANSMISSION FOR DOWNLINK TRANSMISSION IN WIRELESS COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Seok-Ki Ahn, Daejeon (KR); Sung-Ik Park, Daejeon (KR); Jae-Hyun Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 83 days.

(21) Appl. No.: 16/823,322

(22) Filed: Mar. 18, 2020

(65) Prior Publication Data

US 2020/0304246 A1  Sep. 24, 2020

(30) Foreign Application Priority Data

Mar. 21, 2019 (KR) .................. 10-2019-0032361
Aug. 2, 2019 (KR) .................. 10-2019-0094221
Mar. 3, 2020 (KR) .................. 10-2020-0026646

(51) Int. Cl.
*H04L 1/18* (2006.01)
*H04L 1/00* (2006.01)
*H04W 72/00* (2009.01)
*H04W 76/18* (2018.01)
*H04W 4/06* (2009.01)

(52) U.S. Cl.
CPC .......... *H04L 1/1819* (2013.01); *H04L 1/0004* (2013.01); *H04L 1/0055* (2013.01); *H04L 1/0061* (2013.01); *H04W 4/06* (2013.01); *H04W 72/005* (2013.01); *H04W 76/18* (2018.02)

(58) Field of Classification Search
CPC ... H04L 1/1819; H04L 1/0061; H04L 1/0004; H04W 72/005; H04W 76/18; H04W 4/06
See application file for complete search history.

(56) References Cited

U.S. PATENT DOCUMENTS

| | | | | |
|---|---|---|---|---|
| 7,924,761 | B1 * | 4/2011 | Stevens | H03M 13/6306 370/315 |
| 2010/0199140 | A1 * | 8/2010 | Lee | H04L 1/1607 714/749 |
| 2016/0329995 | A1 * | 11/2016 | Jiang | H04L 1/1861 |
| 2018/0014163 | A1 * | 1/2018 | Herrmann | H04L 1/1896 |
| 2019/0053218 | A1 | 2/2019 | Kim et al. | |
| 2019/0068318 | A1 * | 2/2019 | Marinier | H04L 1/0065 |
| 2019/0386782 | A1 | 12/2019 | Yang et al. | |
| 2020/0028523 | A1 * | 1/2020 | Li | H03M 13/6516 |

FOREIGN PATENT DOCUMENTS

KR  101745648 B1  6/2017
KR  1020180103019 A  9/2018

* cited by examiner

*Primary Examiner* — Jackie Zuniga Abad
(74) *Attorney, Agent, or Firm* — Rabin & Berdo, P.C.

(57) ABSTRACT

Disclosed herein are a method of retransmission for downlink transmission of a wireless communication system and an apparatus for the same. The method includes receiving multiple feedback signals corresponding to a transmission failure from multiple terminals corresponding to point-to-multipoint transmission, generating retransmission data in response to the multiple feedback signals, and transmitting the retransmission data to the multiple terminals.

14 Claims, 8 Drawing Sheets

INFORMATION SYMBOLS    PARITY SYMBOLS

$$\begin{pmatrix} s_1 & s_2 & s_3 & s_4 & s_5 & s_6 & p_1 & p_2 & p_3 & p_4 \\ 0 & 1 & 1 & 0 & 1 & 0 & 1 & 0 & 0 & 0 \\ 1 & 0 & 1 & 0 & 0 & 0 & 1 & 1 & 0 & 0 \\ 1 & 1 & 0 & 1 & 1 & 1 & 0 & 1 & 1 & 0 \\ 0 & 1 & 1 & 0 & 0 & 1 & 0 & 0 & 1 & 1 \end{pmatrix}$$

$s_2 + s_3 + s_5 + p_1 = 0 \pmod{2}$
$s_1 + s_3 + p_1 + p_2 = 0 \pmod{2}$
$s_1 + s_2 + s_4 + s_5 + s_6 + p_2 + p_3 = 0 \pmod{2}$
$s_2 + s_3 + s_6 + p_3 + p_4 = 0 \pmod{2}$

METHOD OF RETRANSMISSION FOR DOWNLINK TRANSMISSION IN WIRELESS COMMUNICATION SYSTEM AND APPARATUS FOR THE SAME

CROSS REFERENCE TO RELATED APPLICATIONS

This application claims the benefit of Korean Patent Application No. 10-2019-0032361, filed Mar. 21, 2019, No. 10-2019-0094221, filed Aug. 2, 2019, and No. 10-2020-0026646, filed Mar. 3, 2020, which are hereby incorporated by reference in their entireties into this application.

BACKGROUND OF THE INVENTION

1. Technical Field

The present invention relates generally to Hybrid Automatic Repeat reQuest (HARQ) technology, and more particularly to retransmission technology applicable to downlink services in multicast/broadcast (point-to-multipoint) communication.

2. Description of the Related Art

A wireless communication system uses a Hybrid Automatic Repeat reQuest (HARQ) technique as one of the techniques for improving data transmission reliability. This technique is still being used in 5G New Radio (NR) as well as in 3G and 4G Long-Term Evolution (LTE). The HARQ technique increases the probability of success in data decoding at a receiver by performing additional retransmission when data decoding fails after data is transmitted over a downlink (DL) or an uplink (UL). In 3G, 4G LTE, and 5G NR, HARQ is supported for DL/UL point-to-point unicast data transmission.

In a wireless communication system, the data to be transmitted over a physical channel is delivered from an upper layer (MAC layer) to a physical layer in the form of a transport block (TB), and the TB is segmented into smaller code blocks (CBs). Then, channel encoding is performed on each of the CBs. The CBs encoded through channel encoding are concatenated and transmitted over the physical channel.

In 3G, 4G LTE, and 5G NR, whether to perform retransmission is determined depending on whether reception of each TB succeeds or fails. When downlink data transmission is performed, if decoding is successfully performed, an ACK signal is fed back to a transmitter, but if not, a NACK signal is fed back thereto. Specifically, upon receiving data, a receiver performs channel decoding thereon and determines whether decoding of each CB succeeds. After channel decoding, when an error is detected in one or more CBs in a TB or when an error is detected in the TB, a NACK signal is fed back, whereby retransmission is performed in units of TBs.

The transmitter is not aware of the CB in which decoding fails, so an error occurs among one or more CBs transmitted therefrom. Therefore, the transmitter transmits additional bits for increasing the probability that all of the CBs included in the TB will be successfully decoded. However, because additional bits are also transmitted for CBs that can be successfully decoded without the additional bits, resources for transmitting the additional bits for such CBs may be regarded as being wasted.

In 5G NR, the standard includes a method for feeding back information about whether decoding succeeds or fails for each Code Block Group (CBG), which has a size greater than or equal to the size of a CB and less than the size of a TB, for resource-efficient retransmission when unicast transmission is performed. This method is referred to as a CBG-based HARQ technique. When the CBG-based HARQ technique is used, the amount of additional bits transmitted for successfully decoded CBs is reduced compared to the conventional method, whereby physical-layer resources may be used more efficiently. However, this method has a disadvantage in that the amount of control information transmitted over a feedback channel is increased, and because CBs in which an error occurs, among CBs included in a CBG, are not known, resources are still wasted.

Meanwhile, when the same data is simultaneously transmitted to multiple terminals, multicast/broadcast (point-to-multipoint) transmission, which is configured to simultaneously transmit the same data to the multiple terminals using the same resource, is more efficient than unicast transmission, which is configured to transmit the data by allocating individual resources to the multiple terminals. The multicast/broadcast transmission method is referred to as Multimedia Broadcast Multicast Services (MBMS) in 3G and is referred to as evolved MBMS (eMBMS)/Further evolved MBMS (FeMBMS) in 4G LTE. Here, the MBMS are largely classified into a Multicast Broadcast Single-Frequency Network (MBSFN) method and a Single-Cell Point-to-Multipoint (SC-PTM) method.

Until 4G LTE, the MBMS technique is performed using a downlink-only method without the assistance of an uplink (UL). Accordingly, an HARQ method based on ACK/NACK feedback through an uplink is not used.

SUMMARY OF THE INVENTION

An object of the present invention is to provide Hybrid Automatic Repeat reQuest (HARQ) services in a resource-efficient manner in a unicast transmission environment or in a multicast/broadcast (point-to-multipoint) transmission environment, in which the same data is simultaneously transmitted to multiple terminals using the same resource.

Another object of the present invention is to generate optimum retransmission data by taking the transmission environments of multiple terminals into consideration in a multicast/broadcast (point-to-multipoint) transmission environment and to provide the generated retransmission data to the multiple terminals.

A further object of the present invention is to transmit/receive a control signal for generating optimum retransmission data by taking the transmission environments of multiple terminals into consideration in a multicast/broadcast (point-to-multipoint) transmission environment.

In order to accomplish the above objects, a method of retransmission for downlink transmission according to the present invention includes receiving multiple feedback signals corresponding to a transmission failure from multiple terminals corresponding to point-to-multipoint transmission, generating retransmission data in response to the multiple feedback signals, and transmitting the retransmission data to the multiple terminals.

Here, generating the retransmission data may be configured to generate the retransmission data for increasing the probability that multiple code blocks included in a transport block will be successfully decoded, regardless of a code block in which the transmission failure occurs. Here, the multiple code blocks may be all of the code blocks included in the transport block.

Here, generating the retransmission data may include generating additional code blocks using physical-layer CB-level FEC in which each of the multiple code blocks is represented as a single information symbol, and generating the retransmission data using bits through which the additional code blocks are able to be restored.

Here, the additional code blocks may correspond to respective parity symbols generated through the physical-layer CB-level FEC.

Here, each of the additional code blocks may have a length that is equal to the length of the longest code block, among the multiple code blocks.

Here, the retransmission data may be used to restore the code block corresponding to the transmission failure using CB-level decoding performed by including the results of decoding of previously transmitted code blocks.

Here, the CB-level decoding may be decoding on a binary erasure channel (BEC) in which code blocks and additional code blocks corresponding to the transmission failure are treated as erased.

Here, the code block corresponding to the transmission failure may be restored using code blocks that are successfully decoded.

Here, the multiple feedback signals may include the number of code blocks corresponding to the transmission failure.

Here, the method may further include transmitting a control signal corresponding to the retransmission data to the multiple terminals. Here, the control signal may include information corresponding to the number of additional code blocks.

Here, the multiple terminals may calculate the number of additional code blocks using MCS information and resource information corresponding to the retransmission data.

Here, generating the retransmission data may include determining a retransmission group using the multiple feedback signals, and generating the retransmission data using additional bits for respective code blocks included in the retransmission group. Here, the retransmission group may be a transport block or a code block group.

Also, a base station of a wireless communication system according to an embodiment of the present invention includes at least one processor, an RF unit controlled by the processor and configured to transmit/receive a wireless signal, and memory connected with the processor and configured to store at least one instruction executed by the processor. Here, the at least one instruction may be configured to receive multiple feedback signals corresponding to a transmission failure from multiple terminals corresponding to point-to-multipoint transmission, to generate retransmission data in response to the multiple feedback signals, and to transmit the retransmission data to the multiple terminals.

Here, the retransmission data may be data for increasing the probability that multiple code blocks included in a transport block will be successfully decoded, regardless of a code block in which the transmission failure occurs.

Here, the retransmission data may be generated using bits through which additional code blocks are able to be restored. Here, the additional code blocks may be generated using physical-layer CB-level FEC in which each of the multiple code blocks is represented as a single information symbol.

Here, the additional code blocks may correspond to respective parity symbols generated through the physical-layer CB-level FEC.

Here, each of the additional code blocks may have a length that is equal to the length of the longest code block, among the multiple code blocks.

Also, a terminal of a wireless communication system according to an embodiment of the present invention includes at least one processor, an RF unit controlled by the processor and configured to transmit/receive a wireless signal, and memory connected with the processor and configured to store at least one instruction executed by the processor. Here, the at least one instruction may be configured to transmit a feedback signal corresponding to the transmission failure of first transmitted data, to receive retransmission data corresponding to the feedback signal, and to restore a code block corresponding to the transmission failure using the retransmission data, the retransmission data being data for increasing the probability that multiple code blocks included in a transport block will be successfully decoded, regardless of the code block in which the transmission failure occurs.

Here, the retransmission data may be generated using bits through which additional code blocks are able to be restored. Here, the additional code blocks may be generated using physical-layer CB-level FEC in which each of the multiple code blocks is represented as a single information symbol.

Here, the additional code blocks may correspond to respective parity symbols generated through the physical-layer CB-level FEC.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings. Particularly, the present invention includes a method of generating retransmission data (a retransmission packet) to be transmitted through a Hybrid Automatic Repeat reQuest (HARQ) process, a method of transmitting/receiving a control signal related thereto, and the operation of a base station and a terminal related thereto when at least one terminal feeds back a NACK signal in response to point-to-multipoint transmission, including point-to-point transmission.

Figure 1:
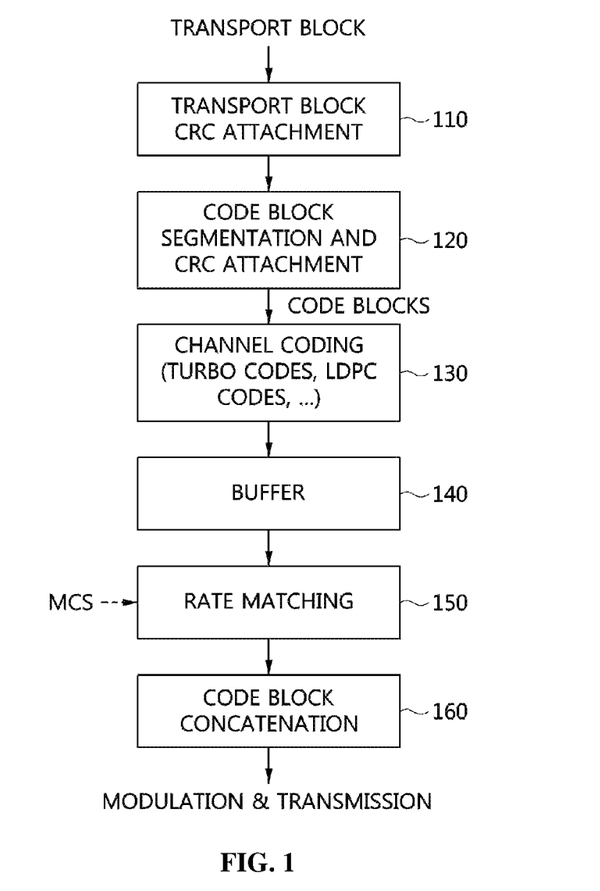
FIG. 1 is a block diagram illustrating the process of processing a transport block according to an embodiment of the present invention.

FIG. 1 is a block diagram illustrating the process of processing a transport block according to an embodiment of the present invention.

Referring to FIG. 1, a physical layer transport block based on 3G, 4G LTE, and 5G NR standards is segmented into code blocks.

That is, a TB CRC attachment unit 110 attaches a cyclical redundancy check (CRC) bits to a transport block (TB) provided from an upper layer, and a CB segmentation and CRC attachment unit 120 segments the TB, to which the CRC bits are attached, into code blocks, each of which has a shorter length than the TB, and attaches CRC bits to each of the segmented code blocks. Here, the CRC bits attached to the TB and the CRC bits attached to the code blocks may be used in order to detect an error in the TB or the code blocks at a receiver.

Physical-layer channel encoding is performed on each code block. Here, the segmented code blocks may have different lengths.

A channel-coding unit 130 performs channel coding on each code block. That is, physical-layer channel encoding may be performed on the individual code blocks. Here, in the case of channel encoding, turbo codes may be used in 3G and 4G LTE, and low-density parity-check (LDPC) codes may be used in 5G NR. Each of the encoded code blocks (CBs), generated through channel encoding, has a length greater than the length of the code block.

A buffer 140 stores the channel-encoded code blocks.

After channel encoding, as many bits as the number of bits used for the first transmission, which is calculated from physical-layer resources used for the transmission and a Modulation and Coding Scheme (MCS), are selected from among the bits included in the encoded code block, and this process is referred to as rate-matching. That is, a rate-matching unit 150 selects the bits necessary for transmission. The rate-matching unit 150 may conceptually store codeword bits, which are generated through channel encoding, in a circular buffer and read as many bits as necessary for transmission from the circular buffer, which is referred to as circular-buffer rate-matching (CBRM).

A code block concatenation unit 160 concatenates the bits selected through rate-matching for each code block, and the concatenated bits are transmitted over a physical channel after being modulated.

At a receiver, a channel-decoding process is performed on each code block, and turbo decoding or LDPC decoding may be performed.

At the receiver, when an error is detected in one or more code blocks using a code block CRC or detected in a transport block using a transport block CRC, the decoding error is announced, and a NACK signal is fed back, whereby retransmission may be requested.

Upon receiving the NACK feedback signal, the transmitter configures additional bits using the codeword bits, which are generated through channel encoding and stored in the buffer, and transmits the same, thereby increasing the probability that a code block will be successfully decoded at the receiver.

Similar to the first transmission, retransmission is also configured such that the additional bits to be transmitted are selected from among the bits stored in the buffer for each code block and concatenated and transmitted. Here, when first transmission or retransmission is performed, determination of the position of the bits to be read, among the codeword bits stored in the buffer, is represented using a Redundancy Version (RV). In 3G, 4G LTE, and 5G NR, four positions are allowed for an RV, and the RV value for the first transmission may be different from the RV value for retransmission. The RV value may be transmitted from a base station to a terminal as a portion of downlink control information (DCI).

Figure 2:
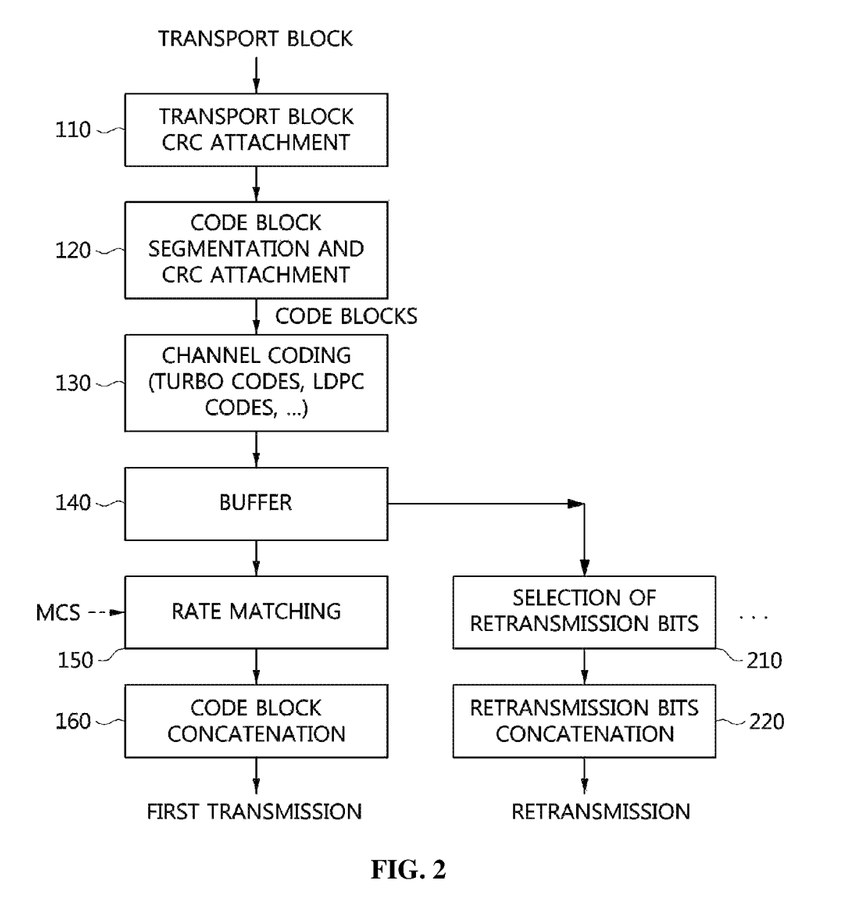
FIG. 2 is a block diagram illustrating a retransmission process according to an embodiment of the present invention.

FIG. 2 is a block diagram illustrating a retransmission process according to an embodiment of the present invention.

Referring to FIG. 2, a retransmission process includes blocks 210 and 220 for processing a retransmission request when the retransmission request is made in response to the first transmission.

The TB CRC attachment unit 110, the CB segmentation and CRC attachment unit 120, the channel-coding unit 130, the buffer 140, the rate-matching unit 150, and the code-block concatenation unit 160 illustrated in FIG. 2 were already described with reference to FIG. 1.

A retransmission bits selection unit 210 selects the additional bits to be retransmitted from among the bits stored in the buffer for each code block, similar to the first transmission.

A retransmission bits concatenation unit 220 concatenates the selected additional bits, and the concatenated bits are retransmitted over a physical channel after being modulated.

Particularly in 5G NR, the retransmission operation illustrated in FIG. 2 may be performed for all of the code blocks (CBs) included in a transport block (TB) (that is, in units of TBs), or may be performed in units of code block groups (CBGs), each having a size equal to or greater than the size of a CB and less than the size of a TB. In the case of CBG-based retransmission, when a terminal feeds back ACK or NACK, that is, information about whether decoding succeeds or fails for each CBG including one or more code blocks, a base station may retransmit only additional bits for all of the CBs included in the CBG in which a decoding error occurred. Here, in order to support CBG-based retransmission, DCI may include a CBG transmission information (CBGTI) field and a CBG flushing out information (CBGFI) field.

Particularly, because the MBMS technique of 5G NR is allowed to include uplink UL signal transmission for MBMS, it is very important to design a resource-efficient HARQ technique for point-to-multipoint transmission using 5G NR.

In the case of point-to-multipoint transmission, such as multicast or broadcast, a greater variety of situations may occur compared to unicast, and it is necessary to provide HARQ services in consideration of the variety of situations. For example, when multicast or broadcast transmission is performed, a physical channel between a base station and a terminal may change depending on the physical position of the terminal in a cell, and the magnitude or pattern of interference that the terminal encounters may also change. In such an environment, the code block in which a decoding error occurs may be different in each terminal. According to the technical spirit of the present invention, the base station may generate an optimum retransmission signal when multiple terminals receiving a multicast/broadcast transmission signal detect a decoding error in different code blocks.

Figure 3:
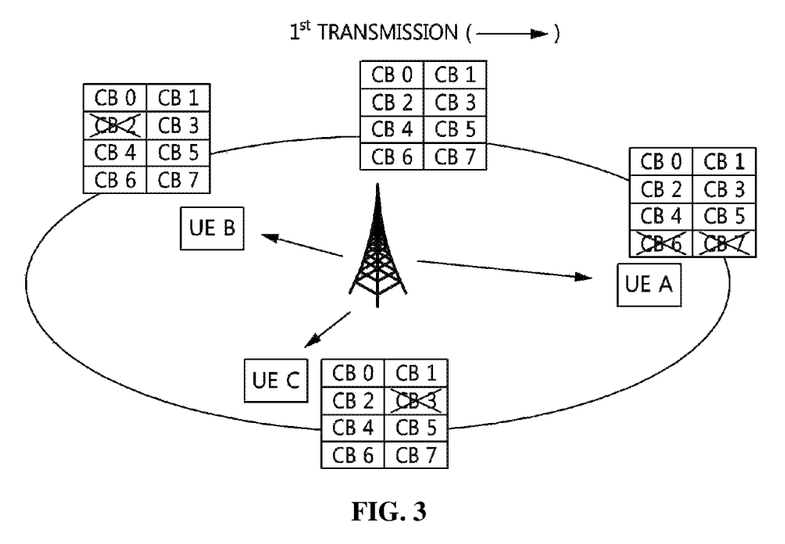
FIG. 3 is a view illustrating an example in which the numbers of code blocks corresponding to the decoding error or the positions of code blocks corresponding to the decoding error are different in multiple terminals that receive the same transport block.

FIG. 3 is a view illustrating an example in which the numbers of code blocks corresponding to the decoding error or the positions of the code blocks corresponding to the decoding error are different in multiple terminals that receive the same transport block.

Referring to FIG. 3, when the first transmission is performed, a transport block, including eight code blocks CB 0, CB 1, CB 2, CB 3, CB 4, CB 5, CB 6 and CB 7, is transmitted from a base station using broadcast transmission. That is, in the example illustrated in FIG. 3, the same transport block is simultaneously transmitted to multiple terminals using the same resource, and the number of CBs in which a decoding error occurs or the position of the CB in which the decoding error occurs may be different in the respective terminals. In FIG. 3, the CB in which a decoding error occurred is marked with 'X'.

According to an embodiment, retransmission may be performed for each code block group (CBG) when point-to-multipoint transmission is performed. Here, the terminal receiving data through point-to-multipoint transmission may explicitly transmit information about the CBG that includes the CB for which decoding failed to the base station when a decoding error occurs. In this case, the signal that the terminal feeds back for HARQ may include bits for identifying the CBG in which the decoding error occurred. For example, the signal that the terminal feeds back for HARQ may include a number of bits corresponding to the number of CBGs. Here, a CBG in which all CBs are successfully decoded may be represented as 0 and a CBG including a code block for which decoding failed may be represented as 1.

When the base station receives an ACK/NACK feedback signal for each CBG from the multiple terminals, which received the point-to-multipoint signal, the base station may configure a packet, which will be retransmitted in a point-to-multipoint manner or a point-to-point manner.

When a point-to-multipoint method is used, all of the CBGs in which a decoding error occurred in one or more terminals are included in the packet to be retransmitted, and the base station configures a retransmission packet including additional parity bits for the CBs included in the corresponding CBGs and retransmits the same in a point-to-multipoint manner.

Figure 4:
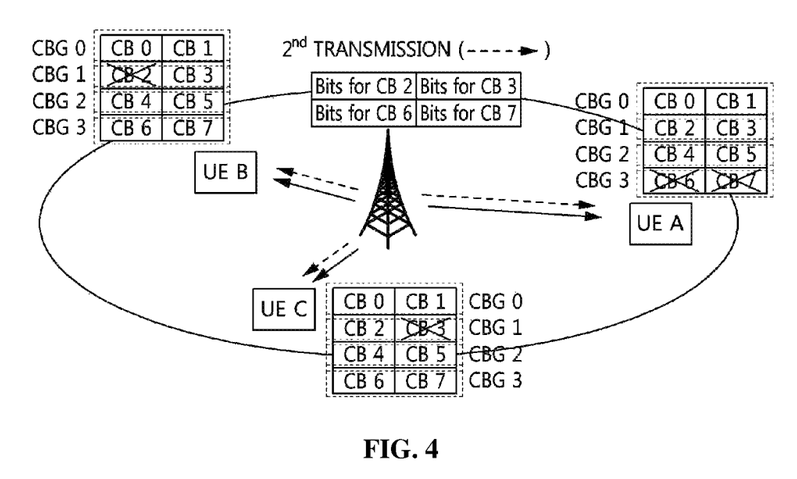
FIG. 4 is a view illustrating an example in which retransmission is performed based on a code block group according to an embodiment of the present invention.

FIG. 4 is a view illustrating an example in which retransmission is performed based on a code block group according to an embodiment of the present invention.

Referring to FIG. 4, a NACK signal for a code block group CBG 3 is fed back from a terminal UE A, and a NACK signal for a code block group CBG 1 is fed back from terminals UE B and UE C.

In the example illustrated in FIG. 4, a base station may configure retransmission bits for the CBs included in the code block groups CBG 1 and CBG 3 and transmit the same when it performs retransmission.

Here, using a CBGTI field included in DCI for configuring physical resources used for transmitting a retransmission packet, the CBGs included in the retransmission packet may be explicitly announced to the terminal. After it receives the retransmission packet transmitted in a point-to-multipoint manner, the terminal uses only a portion including the CB that the corresponding terminal failed to decode, thereby again decoding the CB for which decoding failed.

According to an embodiment, when retransmission is performed in a point-to-multipoint manner, additional bits for increasing the probability that multiple CBs will be successfully decoded may be transmitted, rather than additional bits for increasing the probability that each of the CBs will be successfully decoded. Here, the multiple CBs may be all of the CBs in the transport block, or may be some of the CBs in the transport block, which may be preset.

That is, according to this embodiment, although the code block (CB) in which an error occurred, among CBs in a transport block (TB), is not known, the additional bits may be useful to decode the corresponding code block and may also be used to correct the decoding error of different CBs when the position of the CB in which an error occurred is different in the multiple terminals.

To this end, additional code blocks are generated from parity symbols, which are generated through encoding that represents a single CB as a single information symbol, after which binary bits for the additional code blocks may be transmitted. Here, encoding is performed by regarding a CB configured with multiple binary bits to be a single symbol. In order to differentiate encoding performed by regarding the binary bits of a CB as information bits, as in channel encoding such as turbo encoding, LDPC encoding, and the like, described with reference to FIG. 1, from encoding performed by regarding each CB as a single information symbol, the latter is referred to as physical-layer CB-level FEC or CBL-FEC. Particularly, physical-layer CB-level FEC is different from packet-based coding performed at an upper layer, such as an application layer or the like, in that it is performed by regarding each of the CBs at a physical layer as a single information symbol.

Here, physical-layer CB-level FEC may produce a form of systematic code. To this end, bits through which CBs, generated from a transport block, can be restored are transmitted when the first transmission is performed, and bits through which additional code blocks, generated through physical-layer CB-level FEC, can be restored may be transmitted when retransmission is required.

Here, physical-layer CBL-FEC may be applied to a CB before or after CRC bits are attached thereto.

Like the existing CBs, the additional code blocks, generated through physical-layer CB-level FEC, are also encoded on a CB basis through turbo coding or LDPC coding, and are transmitted over a physical channel.

Figure 5:
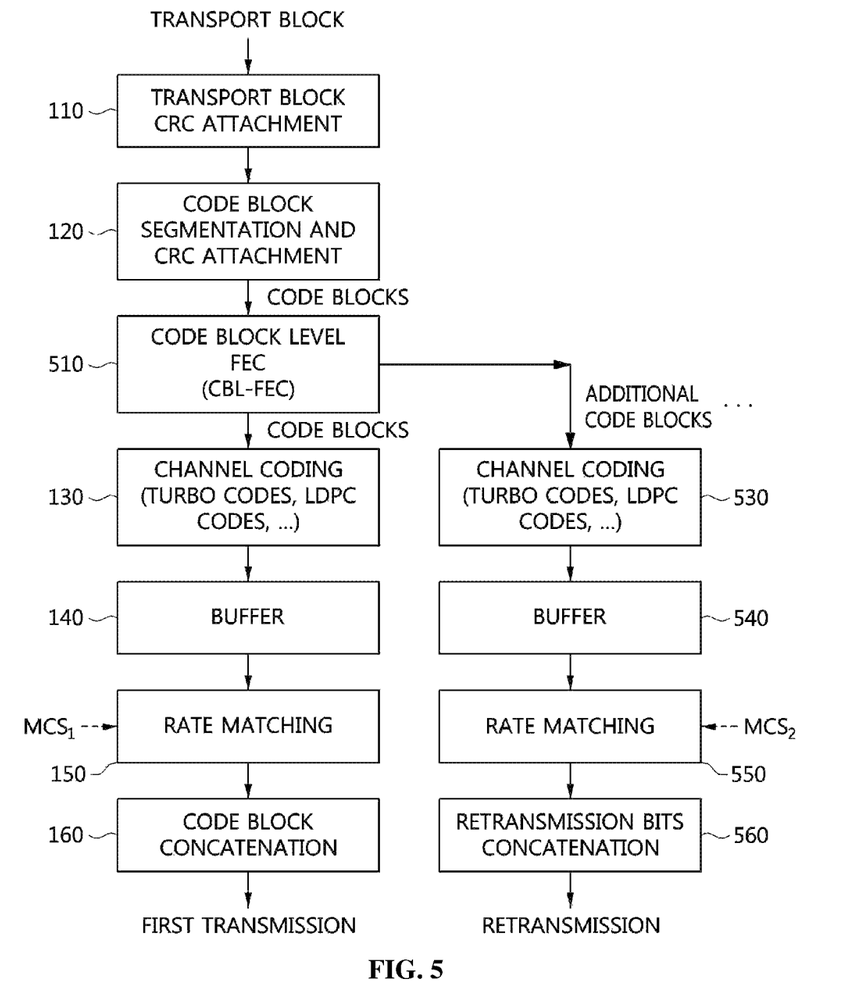
FIG. 5 is a block diagram illustrating a retransmission process based on physical-layer code-block-level FEC according to an embodiment of the present invention.

FIG. 5 is a block diagram illustrating a retransmission process based on physical-layer CB-level FEC according to an embodiment of the present invention.

Referring to FIG. 5, a block for physical-layer CB-level FEC 510 and blocks for retransmission 530, 540, 550 and 550 are included.

The TB CRC attachment unit 110, the CB segmentation and CRC attachment unit 120, the channel-coding unit 130, the buffer 140, the rate-matching unit 150, and the code block concatenation unit 160 illustrated in FIG. 5 were already described with reference to FIG. 1.

The physical-layer CBL-FEC unit 510 performs physical-layer CBL-FEC, which is performed by regarding each of CBs as a single information symbol. As the result of performing physical-layer CBL-FEC, parity symbols are generated, and the generated parity symbols correspond to additional code blocks.

Because physical-layer CBL-FEC is systematic encoding, bits corresponding to CBs, among the results of physical-layer CBL-FEC, may be provided to the channel-coding unit 130 when the first transmission is performed, and bits corresponding to additional code blocks, among the results of physical-layer CBL-FEC, may be provided to the channel-coding unit 530 when retransmission is performed.

The channel-coding unit 530 performs the same operation as the operation of the channel-coding unit 130, but the target of channel coding in the channel-coding unit 530 is the bits corresponding to the additional code block. The channel-coding unit 530 may perform the same channel-coding method as that performed by the channel-coding unit 130, or may perform a channel-coding method that is different from that performed by the channel-coding unit 130.

The buffer 540 stores the bits corresponding to the additional code blocks on which channel coding is performed.

The rate-matching unit 550 selects bits required for transmission. Here, the MCS $MCS_2$ applied to the rate-matching unit 550 may be different from the MCS $MCS_1$ applied to the rate-matching unit 150.

The retransmission bits concatenation unit 560 concatenates the selected additional bits, and the concatenated bits are retransmitted over a physical channel after being modulated.

Hereinafter, physical-layer CBL-FEC will be described in more detail.

Figure 6:
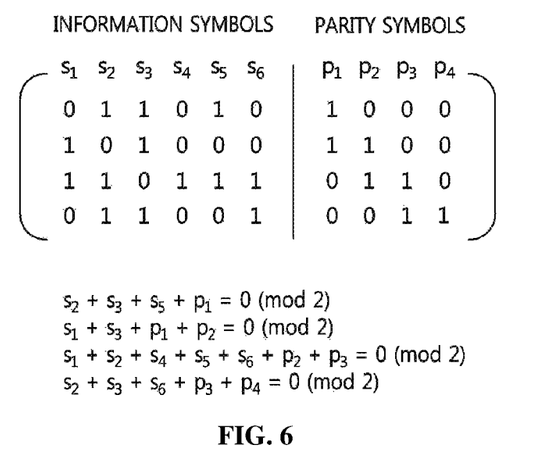
FIG. 6 is a view illustrating an example in which physical-layer code-block-level FEC is represented using a parity check matrix.

FIG. 6 is a view illustrating an example of physical-layer CBL-FEC as a parity-check matrix.

Referring to FIG. 6, four additional code blocks $p_1$, $p_2$, $p_3$ and $p_4$ are generated by performing physical-layer CBL-FEC using six CBs $s_1$, $s_2$, $s_3$, $s_4$, $s_5$ and $s_6$.

In the example illustrated in FIG. 6, each of information symbols corresponds to each of CBs generated from a TB. Also, each of parity symbols corresponds to each of additional code blocks generated through physical-layer CBL-FEC.

The parity check matrix illustrated in FIG. 6 shows the relationship between the information symbols and the parity symbols. After the parity symbols are generated through physical-layer CBL-FEC, the relationship between the CBs and the additional code blocks is determined based on the relationship between the information symbols and the parity symbols.

In FIG. 6, $s_i$ denotes the i-th CB, and $p_j$ denotes the j-th additional code block. Because the CB and the additional code block are long binary vectors, the mod 2 addition of symbols in FIG. 6 may correspond to component-wise mod 2 addition between the binary vectors.

Here, when the CBs generated from the TB have different lengths, the lengths are made equal by padding zeros to the shorter CB to match the length of the longest CB, after which mod 2 addition may be performed.

Consequently, each of the additional code blocks may have a length that is equal to the length of the longest CB, among the CBs.

Although physical-layer CBL-FEC defined as a parity check matrix is illustrated in FIG. 6, physical-layer CBL-FEC may use any of various types of encoding using binary linear codes including LDPC codes, non-linear RS codes, Raptor codes, non-binary Raptor-Q codes, and the like.

After it receives a retransmission packet, a receiver (terminal) may first perform turbo decoding or LDPC decoding in order to decode the additional code blocks, and may then perform CBL-FEC decoding on the result of decoding the additional code blocks, including the result of decoding the first transmitted CBs.

CBL-FEC decoding may be decoding of CB-level code, in which the CBs and the additional code blocks are regarded as information symbols and parity symbols, on a binary erasure channel (BEC). Here, the CBs or additional code blocks corresponding to an error as the result of channel decoding, such as turbo decoding, LDPC decoding, or the like, are treated as erased, after which CBL-FEC decoding may proceed.

In the case of point-to-multipoint transmission, the CBs and additional code blocks treated as erased may be different in the respective terminals.

When a decoding error occurs in a CB after the first transmission, information symbols corresponding to the CB are restored through CBL-FEC decoding on a BEC, and the code block in which the error occurred may be restored using successfully decoded CBs. For example, the CB in which the error occurred may be generated through component-wise mod 2 addition between one or more CBs that are successfully decoded.

Consequently, even though the CBs in which an error occurs are different in the respective terminals, the additional code block may be applied in common to the CBs in which the error occurred through CBL-FEC decoding.

As described above, the additional code blocks generated through physical-layer CBL-FEC may be encoded using a modulation and coding scheme MCS that is different from the scheme used for CBs generated from a TB.

The number of additional code blocks generated through physical-layer CBL-FEC and an MCS $MCS_2$ applied to the additional code blocks may be determined based on the number of CBs that are first transmitted, the number of terminals that simultaneously receive data through point-to-multipoint transmission, and the amount of allocated physical resources. Here, the MCS $MCS_2$ applied to the additional code blocks is set so as to be more robust than the MCS $MCS_1$ applied to the CBs, that is, so as to have a lower MCS index and lower spectral efficiency, whereby the probability that the addition code blocks will be successfully decoded may be increased.

Hereinafter, a UL feedback signal and a DL control signal for retransmission based on physical-layer CBL-FEC will be described.

In order for a terminal to identify the number of additional code blocks included in a retransmission packet, the following two methods may be used.

Method 1) is configured such that a base station explicitly announces a modulation order used for a retransmission packet and the number of additional code blocks to a terminal using DCI.

Method 2) is configured such that, when a base station transmits MCS information to a terminal, the terminal identifies a modulation order from the MCS, acquires a virtual Transport Block Size (TBS) of a retransmission packet from the MCS and physical resources used for retransmission, and calculates the number of additional code blocks based thereon.

When retransmission based on physical-layer CBL-FEC is performed, there is no need to transmit a Redundancy Version (RV) field, which is required in the conventional retransmission method. When the above-described method 1) is used, MCS indices that are reserved in the MCS index table of 3GPP TS 38.214 may be used in order to notify the terminal of the modulation order that is used. Also, in order to limit the number of bits for representing the number of additional code blocks, the acceptable number of additional code blocks may be limited to a certain number. For example, the number of bits for representing the number of additional code blocks may be set equal to the number of bits that are used for the RV field.

When the above-described method 2) is used, an MCS index that is not set to 'reserved' in the MCS index table of 3GPP TS 38.214 must be used as an MCS index included as a portion of DCI, and the terminal acquires a virtual TBS from the physical-layer resources allocated thereto, the number of layers, and the MCS index and divides the acquired virtual TBS by the length of a CB, which is acquired when the first transmission is performed, thereby calculating the number of additional code blocks included when retransmission is performed.

In this case, the base station and the terminal may agree in advance to acquire the number of additional code blocks through floor(x) or ceiling(x) when x, which is the value acquired by dividing the acquired virtual TBS by the length of the first transmitted CB, is not an integer. Here, floor(x) is the maximum integer that is not greater than x, and ceiling(x) is the minimum integer that is not less than x.

Figure 7:
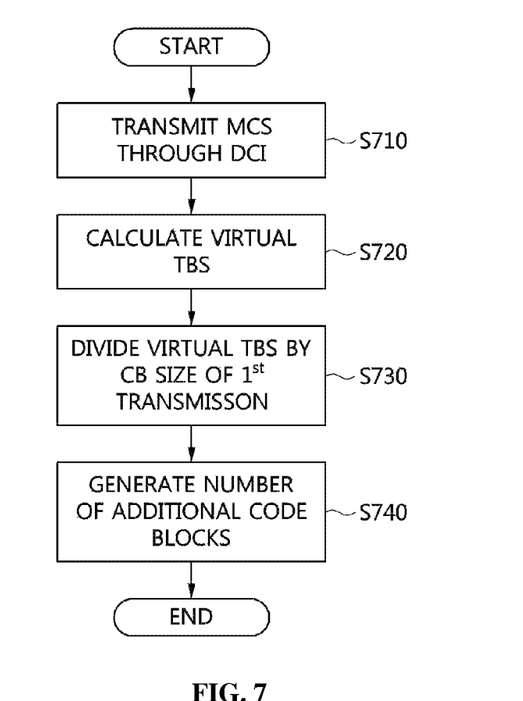
FIG. 7 is a flowchart illustrating an example of the case in which a terminal calculates the number of additional code blocks using a modulation and coding scheme (MCS)

FIG. 7 is a flowchart illustrating an example of the case in which a terminal calculates the number of additional code blocks from an MCS and information about physical resources which are allocated (used) for the retransmission.

Referring to FIG. 7, a base station transmits an MCS to a terminal through DCI at step S710 when retransmission is performed.

The terminal that receives the MCS acquires a virtual TBS from an allocated resource, such as the number of resource blocks (RBs), the number of layers, and an MCS index, at step S720.

The terminal, which acquires the virtual TBS, divides the acquired TBS by the length of a CB, which is acquired when the first transmission is performed, at step S730.

As described above, when the value acquired by dividing the acquired TBS by the length of the CB, which is acquired when the first transmission is performed, is an integer, the value may be used as the number of additional code blocks without change.

When the value acquired by dividing the acquired TBS by the length of the CB, which is acquired when the first transmission is performed, is not an integer, the following step S740 may be performed.

The terminal calculates the number of additional code blocks at step S740 using the value (x) acquired by dividing the TBS by the length of the CB, which is acquired when the first transmission is performed.

Here, at step S740, the number of additional code blocks may be calculated using floor(x) or ceiling(x).

When physical-layer CBL-FEC is used, if a decoding error occurs at a receiver, the number of CBs in which the decoding error occurred may be fed back, rather than transmitting a NACK signal for each TB or each CBG. In this case, after it receives the number of CBs in which the decoding error occurred from the multiple terminals, the base station selects the appropriate number of additional code blocks, thereby configuring a retransmission packet. Here, the number of additional code blocks included in the retransmission packet may be acquired based on the terminal having the greatest number of CBs in which the decoding error occurred, among the multiple terminals.

Hereinafter, an embodiment in which a retransmission method based on a transport block (TB), a retransmission method based on a code block group (CBG), and a retransmission method based on physical-layer CBL-FEC are selectively used when point-to-multipoint transmission is performed will be described. Here, point-to-point retransmission and point-to-multipoint retransmission may be selectively used for retransmission.

The retransmission method based on physical-layer CBL-FEC may be used along with different retransmission methods, and one of the various retransmission methods may be selected based on the area over which signals are broadcast, the number of terminals simultaneously receiving signals, the number/rate of NACK signals that are fed back, and the like when point-to-multipoint transmission is performed. Also, when HARQ based on a CBG is supported, the retransmission method may be selected based on the degree by which the NACK for each CBG fed back from one terminal matches that fed back from another terminal. For example, when an error occurs in the same CBG in the multiple terminals, the retransmission method based on a CBG may be used, but when an error occurs in different CBGs in the respective terminals, retransmission based on physical-layer CBL-FEC may be used. Here, the selection of the retransmission method may be signaled to the terminal using an RRC message, an MAC control element (CE), or DCI.

When a NACK is continuously fed back after retransmission is performed once, additional code blocks are continuously generated through physical-layer CBL-FEC and transmitted, whereby the effective code rate of physical-layer CBL-FEC may be decreased. Alternatively, the parity for the already transmitted code blocks and the additional code blocks is additionally transmitted, whereby the effective code rate of turbo code/LDPC code of the corresponding CBs may be decreased.

For example, when retransmission is performed, HARQ service may be provided by selecting one of 1) TB-based or CBG-based retransmission for transmitting additional bits for the first transmitted CBs and 2) retransmission based on physical-layer CBL-FEC configured to generate additional code blocks and transmit the same.

Figure 8:
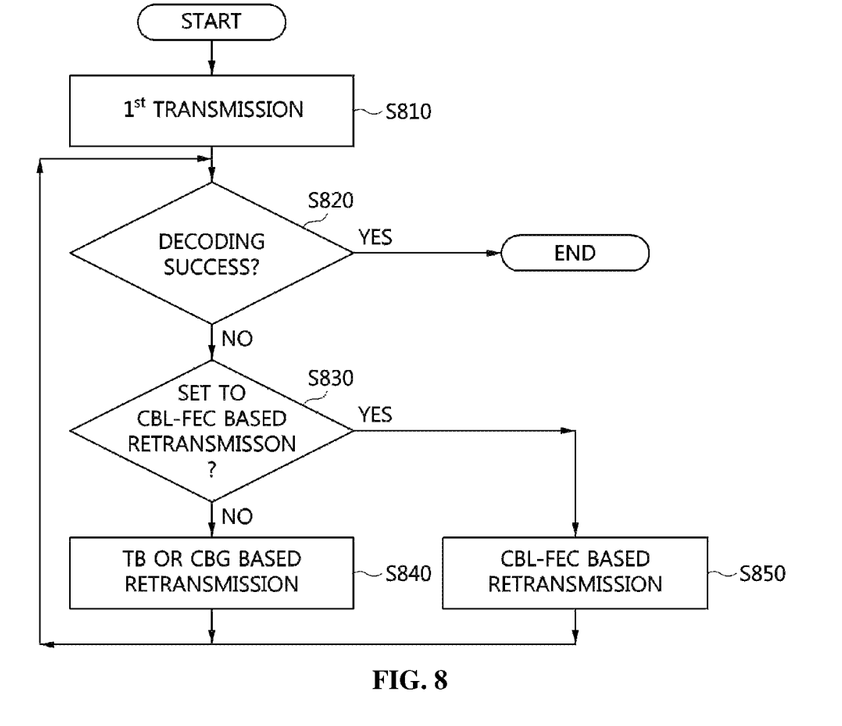
FIG. 8 is a flowchart illustrating an example in which any of two retransmission methods is selectively used.

FIG. 8 is a flowchart illustrating an example in which two retransmission methods are selectively used.

Referring to FIG. 8, after the first transmission is performed at step S810, whether a decoding error occurs is determined at step S820.

When it is determined at step S820 that no decoding error occurs, the process is terminated.

When it is determined at step S820 that a decoding error occurs, whether retransmission based on physical-layer CBL-FEC is set is determined at step S830.

When it is determined at step S830 that retransmission based on physical-layer CBL-FEC is set, retransmission based on physical-layer CBL-FEC is performed at step S850.

When it is determined at step S830 that retransmission based on physical-layer CBL-FEC is not set, retransmission based on a TB or a CBG is performed at step S840.

According to an embodiment, a base station may notify, in advance, a terminal of information about the number of times retransmission based on physical-layer CBL-FEC can be performed, among multiple retransmission attempts, or the time at which retransmission based on physical-layer CBL-FEC can be performed, and may perform retransmission based on physical-layer CBL-FEC only when the corresponding conditions are satisfied. Also, when retransmission is performed, the base station may select either point-to-multipoint retransmission or point-to-point retransmission based on the number of terminals transmitting NACK feedback, the number of CBG NACKs, the number of CBs in which a decoding error occurs, or the like, and may use the selected retransmission method. For example, when the number of terminals feeding back a NACK signal is equal to or less than a certain number, a point-to-point retransmission method may be used, but otherwise, a point-to-multipoint retransmission method may be used.

Further, the retransmission method according to an embodiment of the present invention is applicable to the case in which retransmission is performed for each enhanced layer or base layer when superposition transmission based on Multi-User Superposition Transmission (MUST) is performed in point-to-multipoint transmission.

Figure 9:
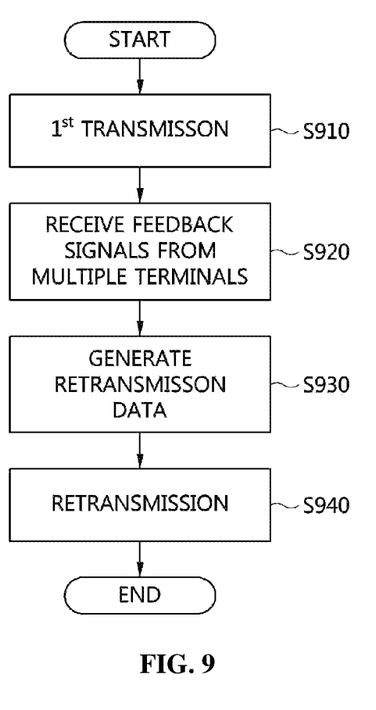
FIG. 9 is a flowchart illustrating an example of a retransmission method for downlink transmission according to an embodiment of the present invention.

FIG. 9 is a flowchart illustrating an example of a retransmission method for downlink transmission according to an embodiment of the present invention.

Referring to FIG. 9, in the retransmission method for downlink transmission according to an embodiment of the present invention, first transmission data including one or more CBs is transmitted at step S910.

Here, the process of generating CBs from a TB and the process of generating first transmission data using the CBs were described in detail with reference to FIG. 1, FIG. 2 and FIG. 5.

Also, in the retransmission method for downlink transmission according to an embodiment of the present invention, multiple feedback signals corresponding to a transmission failure are received from multiple terminals corresponding to point-to-multipoint transmission at step S920.

Here, the multiple feedback signals may include the number of CBs corresponding to the transmission failure.

Also, in the retransmission method for downlink transmission according to an embodiment of the present invention, retransmission data is generated at step S930 in response to the multiple feedback signals.

Here, at step S930, the retransmission data for increasing the probability that the multiple CBs included in the TB will be successfully decoded may be generated regardless of the CB in which the transmission failure occurred. Here, the multiple CBs may be all of the CBs included in the TB or some of the CBs included in the TB.

Here, step 930 may include generating additional code blocks using physical-layer CB-level FEC, in which each of the multiple CBs is represented as a single information symbol, and generating retransmission data using bits through which the additional code blocks can be restored.

Here, each of the additional code blocks may correspond to each of parity symbols generated through physical-layer CB-level FEC.

Here, each of the additional code blocks may have a length equal to the length of the longest CB, among the multiple CBs.

Here, the retransmission data may be used to restore the CB corresponding to the transmission failure using CB-level decoding, which is performed by including the result of decoding of the previously transmitted CBs.

Here, CB-level decoding may be decoding on a binary erasure channel (BEC) in which the CBs and the additional code blocks, corresponding to the transmission failure, are treated as erased.

Here, the CB corresponding to the transmission failure may be restored using the successfully decoded CBs.

According to an embodiment, step S930 may include determining a retransmission group using the multiple feedback signals and generating retransmission data using additional bits for the respective CBs included in the retransmission group. For example, the retransmission group may be a TB including all of the CBs in which a decoding error occurred in the multiple terminals. For example, the retransmission group may be a CBG including all of the CBs in which a decoding error occurred in the multiple terminals.

Also, in the retransmission method for downlink transmission according to an embodiment of the present invention, the retransmission data is transmitted to the multiple terminals at step S940.

According to an embodiment, the retransmission method illustrated in FIG. 9 may further include transmitting a control signal, corresponding to the retransmission data, to the multiple terminals. Here, the control signal may include information corresponding to the number of additional code blocks.

According to an embodiment, the multiple terminals may calculate the number of additional code blocks using MCS information, corresponding to the retransmission data, and resource information, such as the number of resource blocks (RBs), the number of layers, or the like.

Figure 10:
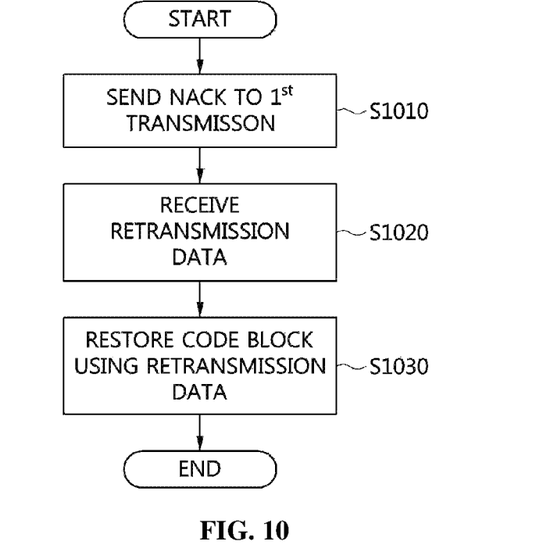
FIG. 10 is a flowchart illustrating an example of a method for receiving a retransmission signal according to an embodiment of the present invention.

FIG. 10 is a flowchart illustrating an example of a method for receiving a retransmission signal according to an embodiment of the present invention.

Referring to FIG. 10, in the method for receiving a retransmission signal according to an embodiment of the present invention, a feedback signal, corresponding to a transmission failure of the first transmitted data, is transmitted at step S1010.

Also, in the method for receiving a retransmission signal according to an embodiment of the present invention, retransmission data corresponding to the feedback signal is received at step S1020.

Here, the retransmission data may be data for increasing the probability that multiple CBs included in a TB will be successfully decoded, regardless of the CB in which the transmission failure occurs.

Here, the retransmission data may be generated using bits through which additional code blocks can be restored. Here, the additional code blocks may be generated using physical-layer CB-level FEC in which each of the multiple CBs is represented as a single information symbol.

Here, the additional code blocks may correspond to respective parity symbols generated through physical-layer CB-level FEC.

Here, each of the additional code blocks may have a length that is equal to the length of the longest CB, among the multiple CBs.

Also, in the method for receiving a retransmission signal according to an embodiment of the present invention, the CB corresponding to the transmission failure is restored using the retransmission data at step S1030.

Here, at step S1030, the CB corresponding to the transmission failure may be restored using CB-level decoding that is performed by including the result of decoding the previously transmitted CBs.

Here, CB-level decoding may be decoding on a binary erasure channel (BEC) in which the CBs and the additional code blocks corresponding to the transmission failure are treated as erased.

Figure 11:
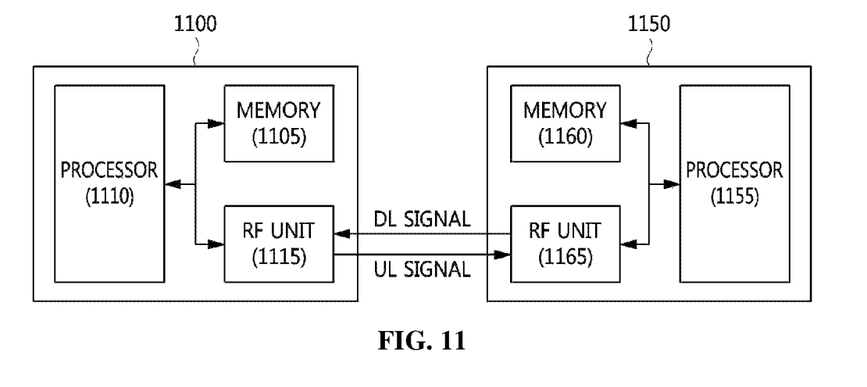
FIG. 11 is a block diagram illustrating a wireless communication system in which an embodiment of the present invention is implemented.

FIG. 11 is a block diagram illustrating a wireless communication system in which an embodiment of the present invention is implemented.

Referring to FIG. 11, a terminal 1100 includes memory 1105, a processor 1110, and an RF unit 1115. The memory 1105 is connected with the processor 1110, thereby storing various kinds of information for operating the processor 1110. The memory 1105 may store at least one instruction executed by the processor 1110. The RF unit 1115 is controlled by the processor 1110 and transmits and/or receives a wireless signal. For example, the RF unit 1115 may receive configuration and/or control information, such as an RRC message, DCI, and the like, and a downlink signal, such as PDSCH and the like, from a base station 1150. Also, the RF unit 1115 may transmit uplink signals, such as PUSCH, HARQ ACK/NACK, and the like, to the base station 1150, or may transmit/receive PSSCH to/from another terminal (not illustrated).

The processor 1110 implements the function of the terminal, the process and/or the method proposed in the present specification. Specifically, the processor 1110 performs the operations of the terminal described with reference to FIG. 10. For example, the processor 1110 may restore a code block in which an error occurs using a retransmission signal based on physical-layer CBL-FEC according to an embodiment of the present invention. Here, retransmission data included in the retransmission signal may be data for increasing the probability that multiple code blocks included in a transport block will be successfully decoded, regardless of the code block in which the transmission failure occurred. Here, the retransmission data is generated using bits through which additional code blocks can be restored, and the additional code blocks may be generated using physical-layer CB-level FEC in which each of the multiple code blocks is represented as a single information symbol. Here, the additional code blocks may correspond to respective parity symbols generated through physical-layer CB-level FEC.

In all of the embodiments of the present specification, the operations of the terminal 1100 may be implemented by the processor 1110.

The memory 1105 may store control information, configuration information, and the like according to the present specification, and may provide the control information, the configuration information, and the like to the processor 1110 in response to a request from the processor 1110.

The base station 1150 includes a processor 1155, memory 1160, and an RF unit 1165. The memory 1160 is connected with the processor 1155, thereby storing various kinds of information for operating the processor 1155. The memory 1160 may include at least one instruction executed by the processor 1155. The RF unit 1165 is controlled by the processor 1155 and transmits and/or receives a wireless signal. The processor 1155 implements the functions of the base station, the process and/or the method proposed in the present specification. In the above-described embodiment, the operations of the base station may be implemented by the processor 1155. The processor 1155 may generate retransmission data using physical-layer CB-level FEC disclosed in the present specification and transmit the same to multiple terminals.

Here, the retransmission data may be data for increasing the probability that multiple (all of) code blocks included in a transport block will be successfully decoded, regardless of the code block in which a transmission failure occurs.

Here, the retransmission data may be generated using bits through which additional code blocks can be restored, and the additional code blocks may be generated using physical-layer CB-level FEC in which each of the multiple code blocks is represented as a single information symbol.

Here, the additional code blocks may correspond to respective parity symbols generated through physical-layer CB-level FEC.

Here, the additional code blocks may have a length equal to the length of the longest code block, among the multiple code blocks.

The processor may include an Application-Specific Integrated Circuit (ASIC), another chipset, a logic circuit and/or a data-processing device. The memory may include Read-Only Memory (ROM), Random-Access Memory (RAM), flash memory, a memory card, a storage medium and/or any other storage devices. The RF unit may include a baseband circuit for processing wireless signals. When an embodiment of the present invention is implemented as software, the above-described method may be implemented as a module (a process, a function, or the like) for performing the above-described functions. The module may be stored in the memory and executed by the processor. The memory may be located inside or outside the processor, and may be connected with the processor using any of various kinds of well-known means.

The method of retransmission based on physical-layer CB-level FEC described through an embodiment of the present invention may be applied not only in a point-to-multipoint transmission environment but also in a point-to-point transmission environment, such as unicast, and may be applied to blind HARQ retransmission having no uplink feedback.

According to the present invention, Hybrid Automatic Repeat reQuest (HARQ) services may be provided in a resource-efficient manner in a point-to-multipoint transmission environment, in which the same data is simultaneously transmitted to multiple terminals using the same resource, or a unicast transmission environment.

Also, the present invention may generate optimum retransmission data (a retransmission packet) by taking the transmission environments of multiple terminals into consideration in a point-to-multipoint transmission environment, and may provide the generated retransmission data to the multiple terminals.

Also, the present invention may generate optimum retransmission data by taking the transmission environments of multiple terminals into consideration in a point-to-multipoint transmission environment.

As described above, the method of retransmission for downlink transmission of a wireless communication system and the apparatus for the same according to the present invention are not limitedly applied to the configurations and operations of the above-described embodiments, but all or some of the embodiments may be selectively combined and configured, so that the embodiments may be modified in various ways.

What is claimed is:

1. A method of retransmission for downlink transmission, comprising:
receiving multiple feedback signals corresponding to a transmission failure from multiple terminals corresponding to point-to-multipoint transmission;
generating retransmission data in response to the multiple feedback signals; and transmitting the retransmission data to the multiple terminals, wherein generating the retransmission data comprises
generating additional code blocks using physical-layer code block level forward error correction (CB-level FEC) coding in which each of multiple code blocks is used as a single information symbol, and
generating the retransmission data using bits through which the additional code blocks are able to be restored, wherein the additional code blocks correspond to respective parity symbols generated through the physical-layer CB-level FEC coding.

2. The method of claim 1, wherein generating the retransmission data is configured to generate the retransmission data for increasing a probability that multiple code blocks included in a transport block will be successfully decoded, regardless of a code block in which the transmission failure occurs.

3. The method of claim 1, wherein each of the additional code blocks has a length that is equal to a length of a longest code block, among the multiple code blocks.

4. The method of claim 3, wherein the retransmission data is used to restore the code block corresponding to the transmission failure using CB-level decoding performed by including results of decoding of previously transmitted code blocks.

5. The method of claim 4, wherein the CB-level decoding is decoding on a binary erasure channel (BEC) in which code blocks and additional code blocks, corresponding to the transmission failure, are treated as erased.

6. The method of claim 5, wherein the code block corresponding to the transmission failure is restored using code blocks that are successfully decoded.

7. The method of claim 6, wherein the multiple feedback signals include a number of code blocks corresponding to the transmission failure.

8. The method of claim 6, further comprising:
transmitting a control signal corresponding to the retransmission data to the multiple terminals,
wherein the control signal includes information corresponding to a number of additional code blocks.

9. The method of claim 6, wherein the multiple terminals calculate a number of additional code blocks using modulation and coding scheme (MCS) information and physical-layer resource information corresponding to the retransmission data.

10. The method of claim 1, wherein generating the retransmission data comprises:
determining a retransmission group using the multiple feedback signals; and
generating the retransmission data using additional bits for respective code blocks included in the retransmission group.

11. A base station of a wireless communication system, comprising:
at least one processor;
an RF unit controlled by the processor and configured to transmit/receive a wireless signal; and
memory connected with the processor and configured to store at least one instruction executed by the processor,
wherein the at least one instruction is configured to receive multiple feedback signals corresponding to a transmission failure from multiple terminals corresponding to point-to-multipoint transmission, to generate retransmission data in response to the multiple feedback signals, and to transmit the retransmission data to the multiple terminals,
wherein the retransmission data is generated using bits through which additional code blocks are able to be restored, and the additional code blocks are generated using physical-layer code block level forward error correction (CB-level FEC) coding in which each of multiple code blocks is used as a single information symbol,
wherein the additional code blocks correspond to respective parity symbols generated through the physical-layer CB-level FEC coding.

12. The base station of claim 11, wherein the retransmission data is data for increasing a probability that multiple code blocks included in a transport block will be successfully decoded, regardless of a code block in which the transmission failure occurs.

13. The base station of claim 11, wherein each of the additional code blocks has a length that is equal to a length of a longest code block, among the multiple code blocks.

14. A terminal of a wireless communication system, comprising:
at least one processor;
an RF unit controlled by the processor and configured to transmit/receive a wireless signal; and
memory connected with the processor and configured to store at least one instruction executed by the processor,
wherein the at least one instruction is configured to transmit a feedback signal corresponding to a transmission failure of first transmitted data, to receive retransmission data corresponding to the feedback signal, and to restore a code block corresponding to the transmission failure using the retransmission data, the retransmission data being data for increasing a probability that multiple code blocks included in a transport block will be successfully decoded, regardless of the code block in which the transmission failure occurs,
wherein the retransmission data is generated using bits through which additional code blocks are able to be restored, and the additional code blocks are generated using physical-layer code block level forward error correction (CB-level FEC) coding in which each of the multiple code blocks is used as a single information symbol,
wherein the additional code blocks correspond to respective parity symbols generated through the physical-layer CB-level FEC coding.

* * * * *